UNITED STATES PATENT OFFICE.

ZUISHO HOTTA, OF TOKYO, JAPAN.

COMPOSITION FOR PREVENTING THE CORROSION AND GALVANO-ELECTRIC ACTION OF METALLIC SUBSTANCES.

No. 916,870.     Specification of Letters Patent.     Patented March 30, 1909.

Application filed August 21, 1908. Serial No. 449,664.

*To all whom it may concern:*

Be it known that I, ZUISHO HOTTA, a subject of the Emperor of Japan, residing at No. 7 Ichome Tamachi Shibaku, Tokyo, Japan, have invented a new and useful Composition for Preventing the Corrosion and Galvano-Electric Action of Metallic Substances, to be used as a coating for any and all metallic substances that are exposed to corrosive and galvano-electrical influences, and particularly for use on ships' bottoms, of which the following is a specification.

My composition consists of the following ingredients, combined in the proportions stated, viz:

Japanese lacquer gum ___ 2 pounds.
    Powdered clay _____ 2 "
    Mica _____ 2 ounces.
    Red oxid of lead _____ 2 fluid ounces.
    Vegetable oil _____ 2 " "
    Pepper _____ 1⅓ ounces.

The Japanese lacquer gum which I use is the well known commercial product of the tree *Rhus vernicifera* and the vegetable oil which I prefer to use is cotton-seed oil. These ingredients are to be thoroughly mingled by agitation. The composition is then applied to the article to be coated by brushing it on or in any other suitable manner.

What I claim as new and desire to secure by Letters Patent of the United States is:—

The herein described composition of matter as a resistant for corrosive and galvano-electric action on metallic articles, consisting of Japanese lacquer gum, powdered clay, mica, red oxid of lead, vegetable oil and pepper, substantially as specified.

ZUISHO HOTTA.

Witnesses:
    KIHACHINO MATSUKI,
    MARION ELLIOT PITMAN.